3,076,508
WELL REACTIVATION
Kenneth Jordan Lissant, St. Louis, Mo., assignor to Petrolite Corporation, Wilmington, Del., a corporation of Delaware
No Drawing. Filed Jan. 11, 1960, Ser. No. 1,456
10 Claims. (Cl. 166—45)

This invention relates to an effective and economical method of reinitiating the flow of petroleum and gas from production and storage gas-containing wells. More particularly, this invention relates to a process of reactivating drowned gas-containing wells.

One problem that exists in the production and storage of gas is that many gas production wells and gas storage projects often suffer partial or complete loss of production or flow due to the accumulation of water in the well base resulting in the formation of a hydrostatic head which is greater than the gas pressure. These wells are often called "drowned" or "water blocked" gas wells. This drowning which results from casing leakage, condensation, or actual water production poses a difficult and expensive problem for the gas industry.

Although many mechanical processes have been used to solve this problem such as by siphoning, bailing, swabbing, etc., these methods require too elaborate equipment, are too expensive, are too time-consuming and tedious, etc. Therefore, it is highly desirable to solve the problem by a more simple means, such as by chemical agents.

When foaming agents are added to drowned wells, their presence in the water cause the formation of foam due to gas capture which results in the gradual lifting of a light foam column by the gas pressures, although these gas pressures are too low to lift the water column itself.

However, there are certain problems encountered in employing foaming agents in drowned gas wells. Unless the foaming agent is satisfactorily and completely mixed with the water in the well base to the desired concentration, maximum foaming and effectiveness are not achieved. In practice, it is difficult to get effective mixing. This is particularly true when the foaming agent is generally thinned with a solvent such as alcohol to allow easy handling and rapid flow down the pipe. Because the foaming agent and solution thereof are light and tend to float on the top of the water column, it is necessary to wash the well with water and to mix this foaming agent by such means as "rocking" the well back and forth by means of a siphon. In addition, some of the liquid foaming agents tend to solidify during cold weather, thus making it necessary to melt prior to use.

I have now discovered that drowned gas wells can be reinitiated by employing "foaming sticks" which are solid units or packages containing the foaming agent. By employing foaming sticks instead of liquids, the difficulties of handling, mixing, etc., are completely avoided since all one needs to do is to drop the stick into the well. On dropping to the water layer, the foaming stick will immediately commence to dissolve leaving a trail of a concentrated solution of foaming agent in the wake of its fall. This trail continues until the stick falls to the bottom or until it is completely dissolved. Because the foaming agent is present throughout the water rather than on the surface as in the case of a liquid, the foaming agent is easily dissolved throughout the system without washing, rocking, etc. The gas, in passing through the trail of foaming agent, completes the job of forming a homogeneous solution of foaming agent in the water and an optimum foam within a short time. Thus, by employing the stick as contrasted to a liquid, handling and mixing are facilitated, losses are minimized, an optimum foam is produced within a short time, and the time for reinitiating drowned wells is reduced. In addition, one may carry out the process without the use of bulky equipment. The sticks can be used rapidly and the necessary materials can be kept in stock since they require a minimum of storage space.

The foaming stick will of necessity be solid on the outside. The inside of the stick may be either solid or liquid. Thus, the stick can be solely a solid foaming agent or a mixture of solid foaming agents, a liquid foaming agent or mixture of liquid foaming agents in a solid, soluble outside container. Of course, the solid foaming agent can also be contained in an outside container, if desired. In addition, where the foaming stick has a specific gravity equal to or less than the water, it may be desirable to employ a weighting agent, for example lead oxide, powdered metal such as powdered lead, barium sulfate, barium oxide, or other desirable materials, most preferably comminuted. The choice of the weighting agent is of course not critical provided it performs its function and is not adversely reactive in the system.

The container may be constructed of virtually any material that is soluble in either the oil well fluids or water, provided that the material has satisfactory physical properties for the use intended. Where large amounts of oil are present, waxes, such as paraffin wax, microcrystalline waxes, or blends of waxes may be employed. Where mostly water is present, water-soluble materials that have been found satisfactory include gelatin, high molecular weight polyalkylene glycols such as "Carbowax," "Polyox" resin (Carbide & Carbon), etc. Where a coating is employed instead of the solid foaming agent itself, my preference is to use a water-soluble encasing material. The essential requirements are that the container must be stable at the usual conditions encountered in storage, soluble or dispersible in either oil well fluids or water so that it breaks up and flushes from the well without clogging in the well tubing or fittings, is physically strong enough to stand filling, shipping, and handling, and tough enough to withstand the abrasion and shock encountered when the container is dropped down the well.

A wide variety of foaming agents can be employed. The following are non-limiting types of foaming agents that can be employed.

A. NONIONIC (1) Oxyalkylated alkylphenols, for example those of the formula

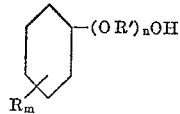

wherein R is an alkyl group, for example containing one to twenty-four or more carbon atoms, R' is the moiety derived from an alkylene oxide such as ethylene, propylene, butylene, etc. oxides added singly, mixed, blocked, etc., $n$ represents the number of moles of alkylene oxide added, for example 1–100 or more, for example 12–40, but preferably 15 to 50, and $m$ represents the number of alkyl substituted groups, for example 1–3 or more. Those compounds which are solid at room temperature, etc., are preferably employed.

Examples include those of the "Triton" series (Rohm

& Haas Co.) such as the oxyethylated octylphenol of the formula:

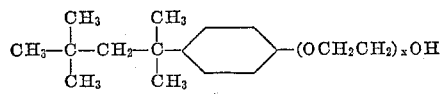

| Triton X-114 | X=7-8 | Liquid |
| Triton X-100 | X=9-10 | Liquid |
| Triton X-102 | X=12-13 | Liquid |
| Triton X-165 | X=16 | Solid |
| Triton X-205 | X=20 | Solid |
| Triton X-305 | X=30 | Solid |

(2)
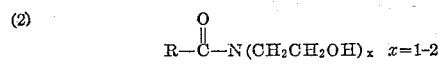

with R as the alkyl moiety of a fatty acid, having preferably 6-24 carbon atoms.

B. CATIONIC

A wide variety of cationic foaming agents can be employed. Non-limiting examples include the following "Priminox" products of Rohm & Haas.

$$R-\overset{H}{N}-(CH_2CH_2O)_nH$$

R=Mixture of isomers, having 18-24 carbon atoms with tertiary alkyl structure.

(1)
"Priminox" 43   $n=1$
"Priminox" 10   $n=5$
"Priminox" 21   $n=15$
"Priminox" 32   $n=25$ (2) Alkyl imidazoline chloride

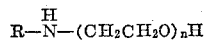

R' and R"=alkyl, benzyl, etc., X=an anion Cl, $SO_4$ etc., such as Geigy Industrial Chemicals.

(3) "Quaternary O"

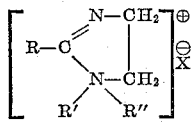

C. ANIONIC (1)
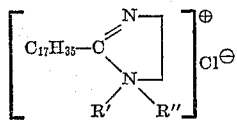

For example, the "Sarkosyl" product produced by Geigy.

(2) The sulfosuccinates such as sodium dioctyl sulfosuccinate,

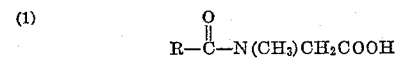

and other compositions

D. AMPHOTERIC

A wide variety of this type of foaming agents can be employed. The more important of this type are the amino acids, for example of the formula RNH—R'COOH and salts and oxyalkylated derivatives thereof where R is a hydrocarbon group such as alkyl, etc., R' is an alkylene group, etc.

The above are only non-limiting examples of suitable foaming agents. A wide variety of other foaming agents can also be employed. Since many surfactants are also excellent foaming agents, and a wide variety of surfactants are known, these can be employed in this invention. A handy reference book which discloses many types of surfactants suitable as foaming agents is "Surface Active Agents and Detergents," vols. I and II, by Schwartz et al., Interscience Publishers, which books are hereby incorporated by reference into this specification.

The chemical nature of the foaming agent used in this process is not critical provided it performs this function. In general, nonionic surfactants are preferred since they do not react with the minerals of the brine. However, under proper conditions any type of foaming agent whether cationic, anionic, amphoteric, or nonionic may be employed.

As is quite evident, foaming agents will be constantly developed which could be useful in this invention. It is, therefore, not only impossible to attempt a comprehensive catalogue of such compositions, but to attempt to describe the invention in its broader aspects in terms of specific chemical names of foaming agents used would be too voluminous and unnecessary since one skilled in the art could by following the testing procedures described herein select the proper agent. This invention lies in foaming agents used in carrying out this invention and their individual composition is important only in the sense that their properties can effect this function. To precisely define each specific chemical composition useful as a foaming agent in light of the present disclosure would merely call for knowledge within the skill of the art in a manner analogous to a mechanical engineer who prescribes in the construction of a machine the proper materials and the proper dimensions thereof. From the description in this specification and with the knowledge of a chemist, one will know or deduce with confidence the foaming agents suitable for this invention by means of the evaluation tests set forth herein. In analogy to the case of a machine wherein the use of certain materials of construction or dimensions of parts would lead to no practical useful result, various materials will be rejected as inapplicable where others would be operative. One can obviously assume that no one will wish to make a useless composition or will be misled because it is possible to misapply the teachings of the present disclosure in order to do so. Thus, any foaming agent that can perform the function stated herein can be employed.

The foaming action of the reagent selected can be tested in the following manner:

TEST PROCEDURES

I. Static System

At room temperature, a solution of foaming agent, usually 0.2-0.1% by weight of active material, in both saturated lime and varying amounts of NaCl is agitated in a milkshake type mixer at 18,000 r.p.m. to produce foam. The initial foam height and foam stability are measured and the initial foam heigh (in ml.) and foam stability (time in seconds for breakout of 100 ml. of solution) are plotted as a function of NaCl% concentration (0-25%). The foaming ability of various agents are thus compared and the best composition employed.

II. Dynamic System

A room temperature, a glass column with air rising through it similar to that described by Randall et al., in Oil and Gas Journal, page 78, November 3, 1958, was used to simulate conditions found in the field. The relative foaming efficiency of various agents is estimated by measuring the amount of solution removed from the column as foam in a given time by plotting percent water removed from the columns as a function of time, generally 1-3 minutes. The test is generally carried out in either 16% NaCl or Navy hard water with a 0.1% solution of the surfactant. The best composition is selected.

If desired, the foaming agents can be tested in the actual brine found in the well.

A few examples will serve to illustrate actual field experience. In these examples a solid stick of oxyalkylated alkylphenol was employed 1.25 in. in diameter and 20 in. long, specifically dinonyl phenol oxyalkylated with 30 moles of ethylene oxide.

EXAMPLE 1

Well "A" had a pressure differential of 28" of mercury when first brought in but this had fallen to 12" just before the test was conducted. Two foaming sticks were dropped into the well and the well was shut in for 30 minutes. It was then blown to the pit for 30 minutes and was put back on the line at a 28" pressure differential.

EXAMPLE 2

Well "B" was a gas condensate well in Texas which showed 300 p.s.i.g. pressure and almost no gas flow. Two sticks were introduced into the well and the well was blown for one hour. It was then put back on the line at 340 p.s.i.g. with 74" of mercury differential.

EXAMPLE 3

Well "C" was producing 3.5 MM c.f.p.d. at 900 p.s.i.g. on a 1" adjustable choke. It was treated with six sticks and shut in for 30 minutes. At that time it would not buck the line pressure. It was blown to the atmosphere for 25 minutes and produced only dry gas. The pressure dropped to nearly zero. At this point the well began to unload. After an additional hour it had produced 10 barrels of distillate and four barrels of water. Fifteen hours later the well was flowing 3.85 MM c.f.p.d. on a 1" choke against 875 p.s.i.g., after having made 10 barrels of distillate and 30 barrels of water.

The following foaming agents are also employed in a similar manner in reactivating gas-containing wells.

EXAMPLE 4

Liquid oxyalkylated alkyl phenol "Triton" X–114 in a "Polyox" casing.

EXAMPLE 5

Liquid "Priminox" 32 in polyvinyl alcohol casing.

EXAMPLE 6

Liquid "Triton" GS–45 in "Polyox" casing.

In summary, the present invention relates to the use of foaming sticks to revive drowned gas-containing wells. Where the foaming agent is a solid, external covering need not be employed. Where the foaming agent is a liquid, a container soluble in the liquid in the drowned well is employed.

The specific foaming agent employed can be selected by the appropriate tests herein described. The number of sticks employed depends on the liquid present in the well and should be such as to yield at least a 0.05% solution in the well, for example 0.5% to 1.5% solution, but preferably 0.1 to 0.3%.

In general, it is preferred to employ at least one stick per three barrels of liquid for example, 0.25 to 2 sticks/barrel, but preferably 0.5 to 1 stick/barrel where oxyalkylated alkyl phenols are employed, when the stick is approximated 1.25" in diameter and 20 inches long. However, the optimum amount employed will depend on the particular well and the particular foaming agent employed. After the foaming stick is added, the well is generally closed for a short period of time and then allowed to blow so that the foaming action will remove the liquid causing the well to drown. Thereupon the well is ready for operation.

In the following claims the term "solid unit" refers to foaming agents which are themselves solid or which, although liquid, are encapsulated to render them solid, i.e., for purposes of handling, the unit employed is a solid as contrasted to a liquid.

Having thus described my invention, what I claim as new and desire to secure by Letters Patent is:

1. A process of reactivating a drowned gas-containing well comprising adding to said well a foam causing surfactant as a solid unit thereby removing the fluid causing drowning.

2. A process of reactivating a drowned gas-containing well which comprises adding to the well a disintegrable foam causing surfactant as a solid unit, permitting said surfactant to dissolve in the fluid, permitting the fluid containing the solution of said surfactant to foam over the top of the well due to the gas pressure of the well so as to displace the water from the well, and then permitting normal flow to resume.

3. The process of claim 1, wherein a nonionic surfactant is employed.

4. The process of claim 2, wherein a nonionic surfactant is employed.

5. The process of claim 3 where the nonionic surfactant is an oxyalkylated compound.

6. The process of claim 4 wherein the nonionic surfactant is an oxyalkylated compound.

7. The process of claim 5, wherein the oxyalkylated compound is an oxyalkylated alkylphenol.

8. The process of claim 6, wherein the oxyalkylated compound is an oxyalkylated alkylphenol.

9. The process of claim 7, wherein the oxyalkylated alkylphenol is a solid at room temperature.

10. The process of claim 8, wherein the oxyalkylated alkylphenol is a solid at room temperature.

References Cited in the file of this patent

UNITED STATES PATENTS

| Number | Name | Date |
|---|---|---|
| 1,970,578 | Schoeller et al. | Aug. 21, 1934 |
| 2,168,116 | Crites et al. | Aug. 1, 1939 |
| 2,352,805 | Scheuermann et al. | July 4, 1944 |
| 2,748,867 | Lissant | June 5, 1956 |
| 2,811,209 | Elkins | Oct. 29, 1957 |
| 2,876,842 | McSpadden | Mar. 10, 1959 |

FOREIGN PATENTS

| Number | Country | Date |
|---|---|---|
| 378,318 | Great Britain | Aug. 11, 1932 |

OTHER REFERENCES

"Wetting Agents, Their Structure, Characteristics, and Uses," Paper Trade Journal, August 22, 1940.

"Surfactants Listed," Soap and Chemical Specialties, March 1958, TP 991.A1 S6 (Overflow Shelf).